United States Patent
Hart et al.

(10) Patent No.: US 10,452,714 B2
(45) Date of Patent: Oct. 22, 2019

(54) CENTRAL ASSET REGISTRY SYSTEM AND METHOD

(71) Applicant: SCRIPPS NETWORKS INTERACTIVE, INC., Knoxville, TN (US)

(72) Inventors: Alden Hart, Falls Church, VA (US); Jay Gelman, Washington, DC (US); Mike Sheridan, Oak Hill, VA (US); William C. Hurst, Knoxville, TN (US); Kamlesh Sharma, Knoxville, TN (US); Alex Garrison, Lenoir City, TN (US)

(73) Assignee: SCRIPPS NETWORKS INTERACTIVE, INC., Knoxville, TN (US)

( * ) Notice: Subject to any disclaimer, the term of this patent is extended or adjusted under 35 U.S.C. 154(b) by 446 days.

(21) Appl. No.: 15/192,145

(22) Filed: Jun. 24, 2016

(65) Prior Publication Data
US 2017/0374392 A1    Dec. 28, 2017

(51) Int. Cl.
*G06F 16/30* (2019.01)
*G06F 16/74* (2019.01)
(Continued)

(52) U.S. Cl.
CPC .............. *G06F 16/74* (2019.01); *G06F 16/41* (2019.01); *G06F 16/9024* (2019.01);
(Continued)

(58) Field of Classification Search
CPC ...... G06F 16/74; G06F 16/9024; G06F 16/41; H04L 67/02; H04L 67/1097; H04L 67/28
See application file for complete search history.

(56) References Cited

U.S. PATENT DOCUMENTS

| 7,996,449 B2 | 8/2011 | Chun et al. |
| 8,015,159 B2 | 9/2011 | Boicey et al. |

(Continued)

FOREIGN PATENT DOCUMENTS

| WO | 00/45294 A1 | 8/2000 |
| WO | 2014037914 A2 | 3/2014 |

OTHER PUBLICATIONS

Ghandhi et al., "Delinearizing Television—An Architectural Look at Bridging MSO Experiences with OTT Experiences," Motorola Mobility, Inc., May 22, 2012, Spring Technical Forum Presentation.
(Continued)

*Primary Examiner* — Tarek Chbouki
(74) *Attorney, Agent, or Firm* — J.A. Lindeman & Co. PLLC; Jeffrey Lindeman; Joseph Parisi

(57) ABSTRACT

A central asset registry ties Digital Asset Management (DAM) repositories into a unified system. The central asset registry removes the tracking of asset relationships from the DAMs by gathering asset metadata tags and capturing relationships between assets to provide improved speed, scalability, and flexibility in analyzing and traversing networks of relationships of digital assets. The central asset registry allows the use of a pluggable architecture and tracks and stores multi-dimensional relationships as an asset hierarchy. The asset hierarchy provides a depiction of relationship data between the assets and provides a flexible array of asset types and properties that allows the addition of new assets and new asset types without re-factoring the other data, nodes, and edges. The system also uses asset metadata to create edge relationships between the assets. The central asset registry facilitates queries and retrieval of the media assets.

20 Claims, 9 Drawing Sheets

(51) Int. Cl.
*G06F 16/901* (2019.01)
*H04L 29/08* (2006.01)
*G06F 16/41* (2019.01)

(52) U.S. Cl.
CPC .......... *H04L 67/02* (2013.01); *H04L 67/1097* (2013.01); *H04L 67/28* (2013.01)

(56) References Cited

U.S. PATENT DOCUMENTS

| | | | |
|---|---|---|---|
| 8,078,618 B2 | 12/2011 | Vanepps et al. | |
| 8,166,076 B2 | 4/2012 | Chen et al. | |
| 8,266,138 B1* | 9/2012 | Collins | G06F 16/21 707/714 |
| 8,296,682 B2 | 10/2012 | Sloo | |
| 8,311,983 B2 | 11/2012 | Guzik | |
| 8,583,644 B2 | 11/2013 | Bedingfield, Sr. | |
| 8,601,467 B2* | 12/2013 | Hofhansl | G06F 8/60 717/177 |
| 8,674,993 B1 | 3/2014 | Fleming et al. | |
| 8,799,945 B2 | 8/2014 | Ozawa et al. | |
| 8,818,929 B2 | 8/2014 | Fraboulet-Laudy et al. | |
| 8,886,674 B1 | 11/2014 | Chaudhry et al. | |
| 8,954,441 B1 | 2/2015 | Baranov et al. | |
| 8,977,646 B2 | 3/2015 | Abrams et al. | |
| 9,589,250 B2* | 3/2017 | Palanisamy | G06Q 10/10 |
| 2002/0032626 A1 | 3/2002 | Dewolf et al. | |
| 2002/0033844 A1 | 3/2002 | Levy et al. | |
| 2002/0188841 A1 | 12/2002 | Jones et al. | |
| 2003/0074471 A1* | 4/2003 | Anderson | H04L 29/12009 709/245 |
| 2003/0130953 A1* | 7/2003 | Narasimhan | G06F 21/10 705/59 |
| 2004/0034622 A1* | 2/2004 | Espinoza | G06F 17/30017 |
| 2004/0148503 A1 | 7/2004 | Sidman | |
| 2005/0131825 A1 | 6/2005 | Vijay | |
| 2005/0182825 A1* | 8/2005 | Eytchison | H04L 67/16 709/217 |
| 2006/0085370 A1 | 4/2006 | Groat et al. | |
| 2007/0073767 A1 | 3/2007 | Springer, Jr. et al. | |
| 2007/0180468 A1* | 8/2007 | Gill | G06F 21/10 725/45 |
| 2008/0140433 A1 | 6/2008 | Levy et al. | |
| 2009/0076872 A1* | 3/2009 | Gosain | G06Q 10/06 705/7.27 |
| 2009/0254562 A1 | 10/2009 | Casaccia | |
| 2009/0254572 A1 | 10/2009 | Redlich et al. | |
| 2010/0036879 A1* | 2/2010 | Friese | G06F 17/30265 707/812 |
| 2010/0251291 A1 | 9/2010 | Pino, Jr. et al. | |
| 2010/0306197 A1 | 12/2010 | Jin et al. | |
| 2010/0325140 A1 | 12/2010 | Hubner et al. | |
| 2011/0126235 A1 | 5/2011 | White et al. | |
| 2012/0078954 A1 | 3/2012 | Araya | |
| 2012/0110043 A1 | 5/2012 | Cavet et al. | |
| 2012/0221610 A1* | 8/2012 | Murphy | G06F 16/68 707/825 |
| 2012/0246734 A1 | 9/2012 | Pride et al. | |
| 2013/0073473 A1 | 3/2013 | Heath | |
| 2014/0068437 A1* | 3/2014 | Dedapper | G06Q 50/01 715/719 |
| 2014/0195675 A1 | 7/2014 | Silver | |
| 2014/0245166 A1* | 8/2014 | Morton | G06F 3/0482 715/743 |
| 2014/0304836 A1 | 10/2014 | Velamoor et al. | |
| 2014/0365468 A1 | 12/2014 | Ormont et al. | |
| 2015/0006656 A1 | 1/2015 | Sinha et al. | |
| 2015/0063102 A1 | 3/2015 | Mestery et al. | |
| 2015/0163206 A1 | 6/2015 | McCarthy et al. | |
| 2015/0193437 A1 | 7/2015 | Fleischman et al. | |
| 2015/0213129 A1 | 7/2015 | Pingree | |
| 2015/0310188 A1 | 10/2015 | Ford et al. | |
| 2017/0017986 A1* | 1/2017 | Mathis | G06Q 30/0242 |
| 2018/0137301 A1* | 5/2018 | Avery | G06F 17/30864 |

OTHER PUBLICATIONS

International Search Report and Written Opinion in International Application No. PCT/US2018/016142, dated Apr. 24, 2018.

* cited by examiner

CENTRAL ASSET REGISTRY SYSTEM AND METHOD

TECHNICAL FIELD

This technology relates to storing, tracking, accessing, and distributing media assets to viewers. More particularly, the technology relates to systems and methods to flexibly integrate multiple Media Asset Management (MAM) repositories capturing the complex relationships between assets to provide rapid asset navigation, storage, and retrieval.

BACKGROUND

Devices that capture and produce still images, video images, audio recordings, animations, and other types of audio, visual, and written content allow the creation of large collections of media assets, including digital media assets. These assets can be stored in a common storage location or distributed across a wide variety of storage locations. The assets may also be physically stored on a wide variety of devices such as tape or computer disk. As the number and size of media assets increases and the storage devices become large and varied, it is increasingly difficult to navigate through the assets to locate and access particular content of interest.

Media companies have thousands of assets with complex, opaque, and multi-dimensional relationships to each other. The assets can be spread across many different institutions, facilities, and vendors. Broadcasters and those entities that deliver these assets must navigate these interconnections on a daily basis, and problems in one system can quickly transmit throughout the enterprise, impacting any number of other business processes in their wake. Understanding and managing relationships between assets is important for many key functions in the enterprise, including content delivery, licensing, advertising, and financial reconciliation. For example, advertising analysts need a clear, detailed understanding of asset viewing and license limitations to calculate values and expected returns on these assets. Yet, broadcasters struggle to understand and analyze the complex web of relationships that are fundamental to their daily operations.

Media asset management involves many diverse disciplines and requires data of various kinds, from a wide array of sources. Multi-platform media companies harness and manage assets from disparate sources to deliver interactive and engaging user experiences. The existing processes for gathering asset metadata and capturing relationships between assets is often manual, ad-hoc, and frequently difficult to repeat or update. Conventional commercial Media Asset Management (MAM) systems require inclusion of all metadata into a single MAM system to capture relationships. This limits the choice of system to a single vendor or suite. The result is a monolithic system that cannot change quickly as new asset types or business needs are introduced.

Many current asset management tools and techniques focusing on relational databases lack both the necessary speed and flexibility to analyze and traverse networks of relationships in a media asset environment.

Distribution of video content is rapidly expanding across multiple platforms, each with different display characteristics and ability to interact with related content. In order to program and distribute efficiently across multiple platforms, content distributors must be able to quickly select a collection of related assets and bundle them for distribution.

SUMMARY

The systems and methods of the claimed invention provide a central asset registry of media assets to tie together multiple Digital Asset Management (DAM) repository systems into a unified whole. By tying together multiple DAMs, the systems and methods of the claimed invention can optimize different DAMs for each major media asset type (e.g., video, recipes, images, writings, and the like). Implementing a centralized registry in accordance with the claimed invention allows the use of a pluggable system architecture. Digital Asset Management (DAM) systems are more general cases of Media Asset Management (MAM) systems. That is, Media Asset Management (MAM) systems include digital assets that are media assets. In this document, the terms are used interchangeably.

Removing the tracking of asset relationships from the Media Asset Management (MAM) repository and creating a central asset registry elegantly addresses problems with gathering asset metadata (with tags, for example) and capturing relationships between assets and provides the necessary speed, scalability and flexibility to analyze and traverse networks of relationships in a media asset environment.

The central asset registry tracks and stores the multi-dimensional relationships between the assets. Relationships such as show/series/episode "part of" hierarchies, inbound and outbound intellectual property rights inheritances, media "version" and "variant" derivation histories, "reference" relationships for ancillary materials, and ad-hoc grouping of assets into sets or containers all can be done in the central asset registry. Adding new relationship types is then just a change to the central asset registry, not to the individual MAM repositories.

While MAM repositories are usually implemented using a relational database, the central asset registry, as a separate system, can be implemented in any desired technology. In fact, the tracking of relationship and identifier information is an ideal candidate for a graph database. The "graph" in graph database refers to relating objects together as a mathematical graph structure. The entire graph area of mathematics is dedicated to studying and representing relationships. Therefore, the use of a graph database for the central asset registry simplifies the expression of the asset hierarchy, enables flexibility in adding relationship types dynamically, allows rapid retrieval from the asset hierarchy, and opens up analytical opportunities not easily available from other database types.

The systems and methods of the claimed invention use graph databases to implement a central asset registry as it relates to a media asset system, such as a multi-platform media company, including a cable television network. Likewise, over-the-top (OTT) and other forms of media distribution can also use the systems and techniques of the claimed invention. The systems implement a central asset registry in conjunction with one or more media asset repositories. Each repository that is referenced by the central asset registry is abstracted by a proxy service masking the underlying platform specifics and repository representation. Instead, a uniform record is created in the central asset registry. Needed assets types and supporting repositories can be added quickly and normalized at the registry layer.

The claimed invention provides an analytical and visual depiction of relationship data. The systems and methods provide graph objects corresponding to the relationship data of media assets and categorize the graph objects that represent a network structure. Instead of storing all the asset metadata in one database along with the relationships, the asset metadata can be spread over multiple MAM databases with the relationships consolidated to a central graph database registry. The central asset registry of the claimed invention stores its data (and allows queries of the data) in the form of a graph, or network-like structure. The graph database of the claimed invention provides performance advantages over conventional relational databases and object-oriented databases.

The claimed invention provides a system and method of organizing cable television and other non-linear media content into a hierarchical tree of nodes. Each node can represent media content, such as a television show, season, episode, segment, or other content. The system can navigate between nodes of the graph with a user interface. In one example embodiment, the system employs a property graph data model with nodes, relationships, properties, and labels. The nodes function as containers for properties. The system uses nodes to represent "things" or "entities" or other things with identities in the realm of media assets, such as cable television content and other non-linear media content including videos viewed on websites, social media, standalone kiosks, and the like. Every node can contain one or more "properties," and the properties represent attributes or qualities of the nodes. The nodes connect or relate to one another with "relationships." Each relationship has a name and a direction to help structure the overall data set and to lend semantic clarity to the data set to understand the context of each of the nodes. The system also attaches properties to the relationships to denote a quality of that relationship (e.g., a qualifier, a weight, etc.). The system also uses metadata (tags) to denote qualities such as a time stamp, or a version number, or the like. Further, the system uses "labels" to assign roles to the nodes. The system can attach one or more labels to each of the nodes to represent the role(s) the node plays within the cable television media asset hierarchy. Labels allow the system to index and group the nodes and to associate specific constraints with the nodes.

The system user interface applications and associated services provide graphical data representing related content (assets) within the hierarchy of the assets consolidated from multiple MAM repositories. The services can be independent software components that can be called from other software components. For example, a service may look up information in a database and return metadata about an asset. Services are independent in that they are packaged and deployed separately to run on a given computer system. Services can call other services. The central asset registry itself and the various underlying repositories are exposed via a software service tier. The service tier provides a single programmatic interface to access asset information across all the integrated repositories. Requesting systems or users require no direct access to the underlying repositories, and security and access control can be enforced outside of the federated repositories. The service tier also abstracts the location of the repositories from the requesting agent. By providing uniform access to the data, the service tier is analogous to a Domain Name System (DNS) for assets. Physical retrieval of the asset instance is also supported at the service tier level supporting potentially long running asynchronous transfers of large files.

The system user interface browses the hierarchy levels of related assets. For example, the related media assets can include an ordered sequence of television show seasons, episodes for each season, video segments for each episode, and the like. The services and user interface applications allow the system to traverse the assets by any relationship type such as rights inheritance, derived assets, versions, reformats, reference assets, and the show/series/episode hierarchies example above. Additionally, the node and edge flexibility of the central asset registry allows the creation of arbitrary containers of assets sets called collections and media carts. This approach provides the flexibility to add new node types and edges while maintaining backwards compatibility. Older systems using the data can continue to use the old relationships to traverse, while new systems can take advantage of the new relationships and node types (such as abstract episode, for example).

Users navigate through the node tree by providing input to traverse to a sibling node (within the same level of the hierarchy) or to a parent or child node (to a different level of the hierarchy). Nodes of the hierarchy can be represented through an interface in a row of graphical content or images.

The system and method of the claimed invention provides benefits over previous systems because it can store, manage and represent complex relationships of media assets used by broadcasters, including assets of similar types, of hierarchical relationships, between companies, and among people. The systems and methods of the claimed invention are modular and can be integrated with any number of MAM repositories, and new relationships and node types can be added at any time. The data corresponding to real-world relationships can be stored in a database in a structure corresponding to the relationships that exists in the digital media field, making manipulation, searching, and representation of the data in the database more efficient and effective. In some embodiments, the graph engine can include an ontological structure, which is represented in the same manner as the asset relationship data. This provides an analytics, querying, and data input platform to maximize the utility of the representations presented to a user and the overall computational power of the graph engine. The system is fast and scalable, and can thus analyze millions or billions of relationships quickly, accurately and flexibly. For example, query times for finding related items in a graph with 2.5 million nodes and 60 million edges averages under 5 milliseconds (ms), even when hosted on modest computer hardware. Conventional relational database queries that depended upon many "join" commands or many recursive joins can be performed many times faster on a graph database, as the traversal query time can be constant no matter how big the graph grows. Traversals in relational databases always get slower as the size of the database increases.

Pulling the relationship information together into a central asset registry of the claimed invention provides a single system with a complete picture of the complex relationships between assets. The resultant database can be quickly searched, using many underlying database implementation technologies. Various database technologies can be used for the central asset registry including search indexes such as Elasticsearch or Solr, relational databases such as Oracle or MySQL, Lightweight Directory Access Protocol (LDAP) directories, or noSQL databases such as a graph database.

Alternate, traditional approaches involving joins over multiple MAM relational databases or polling over multiple MAM systems all result in much more CPU-intensive and IO-intensive computations. The resultant relationship calculation using traditional approaches is more complex, slower and more expensive from a resource perspective.

Although large improvements in search complexity and speed are due to the centralization of the registry, the choice of central asset registry technology further improves search speed and performance. One example implementation discussed below involves the use of a graph database. Graph database traversal time can be a constant no matter how big the graph grows. This is known as O(1) behavior in "Big O" notation for computational complexity. Traversals using other database technologies, such as relational databases like Oracle, always get slower as the size of the database increases. The best such databases can achieve is O(n) without an index (linear increase in time) or O(log n) at best with an index.

The central asset registry of the claimed invention uses graph structures for semantic (meaning) queries with nodes, relationships, and properties to represent and store media asserts. Semantic queries enable the retrieval of both explicitly and implicitly derived information based on syntactic (rules), semantic (meaning), and structural information contained in data (media assets). Semantic queries deliver precise results or answer more fuzzy and wide open questions through pattern matching and digital reasoning. When querying a graph database of the claimed invention, the query processes the actual relationships between information (nodes) and infers the answers from the network of data. Each node in the graph database directly and physically includes a list of relationship-records that represents its relationships to other nodes. The relationship records are organized by type and direction.

The central asset registry graph database of the invention associates information with names to each of the participating entities. The registry node in the graph database acts as a proxy to the real asset stored in one of (possibly) many repositories. This allows the system to have multiple asset repositories (e.g., still image repository, video image repository, recipe repository, etc.) and allows the system to recognize any of the assets across any of the repositories and makes the overall solution look and feel like a single repository. The use of a service layer provides an abstraction layer over the multiple asset repositories. When combined with the central asset registry, the service layer can then transparently direct asset retrieval to the appropriate asset repository.

The central asset registry can maintain a variety of relationships. In addition to those described above, the central asset registry of the claimed invention can track inbound and outbound rights associated with assets over all the MAM repositories. Such rights tracking can be done by enhancing the central asset registry to track relationships between assets and a contract(s) that bears the rights for that asset. In one example implementation, rights are hierarchical. For example, the contract at the show level can be different from a contract at the series level, which can be different then a contract at the episode level. The rights are the composition of these contracts tied together. Having rights tied to the asset hierarchy makes it easier to resolve the rights at any given episode or any given time. The systems and methods of the claimed invention allow users to fold in restrictions as well. For example, inbound rights of a media distributor to a show can include all territories in perpetuity. In licensing the outbound rights to another entity, the outbound rights can be a subset of the inbound rights, such as an exclusive right to a Canadian broadcaster to show the episode in Canada for six months. These rights and restrictions can all be reflected as data on the graphs.

The extensible nature of the central asset registry not only allows incorporation of multiple MAM repositories and inheritable attributes such as intellectual property rights, but also provides a way to add new relationship dimensions. For example, the system supports adding geographical relationships to quickly find episodes about restaurants in Chicago or locations within an arbitrary map polygon.

The claimed invention includes a system and method to create a single, uniform, highly performant view of multiple federated repositories. One example implementation includes a system for managing digital assets in a distributed repository framework. The system includes a plurality of federated repositories connected to a network, and each of the plurality of federated repositories maintains digital assets with metadata tags. The system also includes a central registry of digital assets. The central registry of digital assets receives relationship information, asset identifiers and location information concerning the digital assets from the plurality of federated repositories based on the metadata tags of the digital assets when a digital asset is saved to one of the plurality of federated repositories. The central registry of digital assets stores the relationship information and location information of the digital asset to provide a comprehensive view of the digital assets in the plurality of federated repositories that make up the system.

The system of the invention can include a central asset registry with an asset relation hierarchy that allows rapid navigation and read performance across assets held in multiple repositories. Likewise, the central asset registry can include an asset relationship hierarchy incorporating multiple media types.

In one example system, the central asset registry of digital assets is a graph database. The graph database can include a registry node as a proxy to a corresponding digital asset stored in at least one of the federated repositories. The graph database objects can show a hierarchy of the assets. For example, the graph database can include graph objects corresponding to the relationship data of the digital assets and a categorization of the graph objects representing a hierarchy of the digital assets. Additionally, the graph database can include a property graph data model with nodes, relationships, properties, and labels in a hierarchy of the digital assets.

A system for managing digital assets in a distributed repository framework in accordance with the claimed invention can include a central asset registry that includes a uniform record to each of the digital assets.

Additionally, the system can include a pluggable architecture that provides a proxy of multiple repositories and media types. For example, in one embodiment, the plurality of federated repositories includes at least one pluggable digital asset management (DAM) repository. Further, the pluggable repository can be configured to house a single digital asset type to allow optimization for that asset type. The single digital asset type can be still images, videos, text, recipes, and the like.

In one example implementation, the system for managing digital assets in a distributed repository framework can also include a proxy service masking underlying platform information to abstract the plurality of federated repositories and provide a single interface to the plurality of federated repositories. The systems of the invention have the ability to federate repositories and access to assets in disparate geographic locations, such as when the federated repositories are located in disparate geographic locations.

In some implementations, the central asset registry includes a rights registry. The central asset registry receives rights information concerning the digital assets from the plurality of federated repositories based on the metadata tags of the digital assets when a digital asset is saved to one of the plurality of federated repositories. The relationship registry and/or rights registry is a pluggable architecture.

The structure of the invention provides the ability to rapidly add new media types and relationships to other assets while scaling efficiently. For example, digital assets saved to one of the plurality of federated repositories can include a new relationship type of relationship information based on the metadata tag of at least one digital asset. Similarly, digital assets saved to one of the plurality of federated repositories can include a new asset type or new media type that includes relationship information and location information concerning the new media type digital asset based on the metadata tag of the at least one digital asset. The central asset registry updates the database(s) based on the new media type of asset and its relationship information. That is, the central asset registry receives the new media type relationship information and location information when the new media type digital asset is saved to one of the plurality of federated repositories and updates the comprehensive view of the digital assets in the plurality of federated repositories that make up the system.

In one example embodiment of the invention, the system for managing digital assets in a distributed repository framework includes a service tier that provides a programmatic interface to access digital asset metadata across the plurality of federated repositories. Also, the system can include a digital asset service configured to read metadata tags in the digital assets stored in the federated repositories and provide the metadata tags to the central asset registry.

The systems and methods for managing digital assets in a distributed repository framework of the claimed invention provide additional capabilities and performance not available with previous systems.

DETAILED DESCRIPTION

Figure 1:
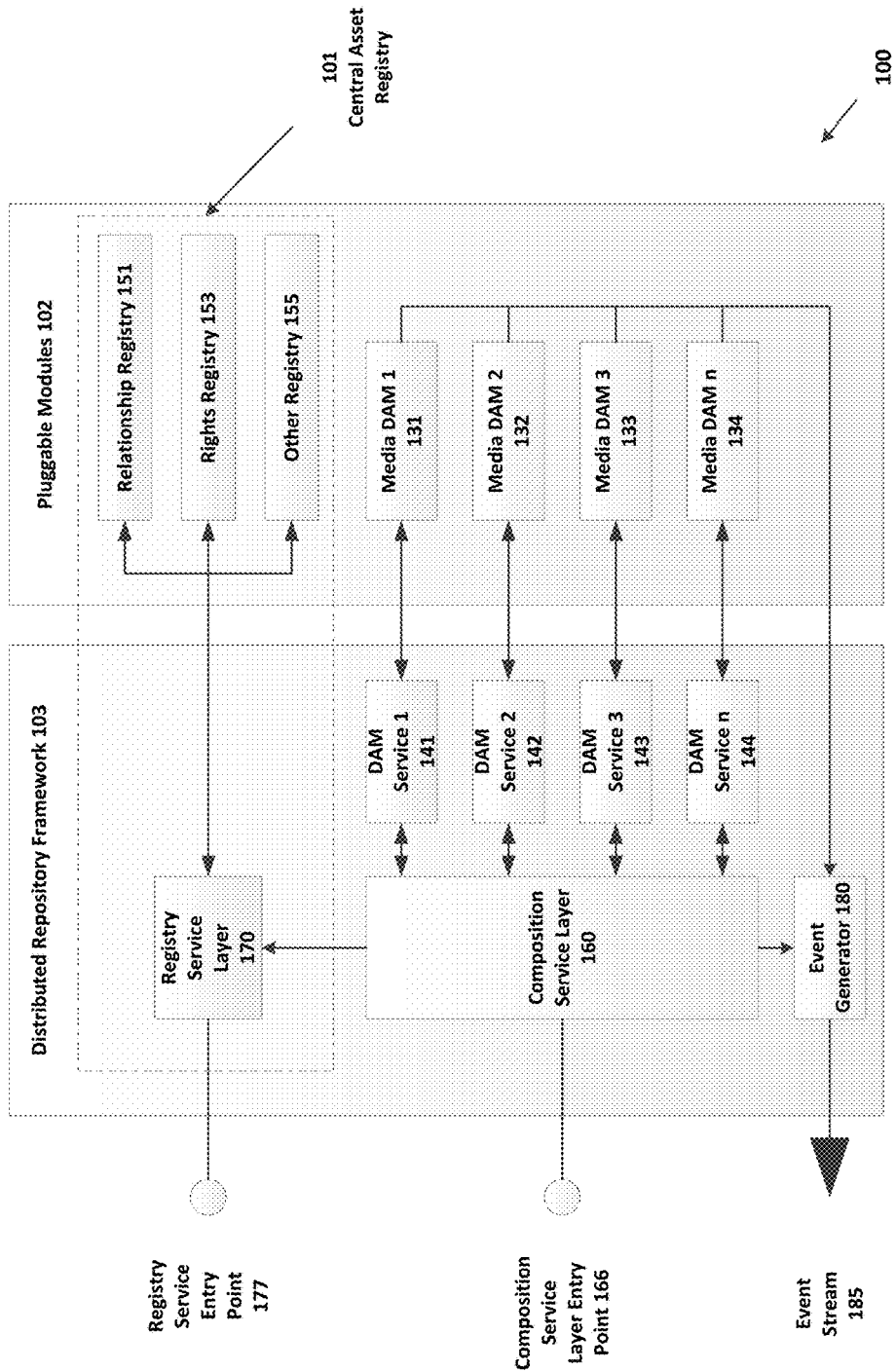
FIG. 1 shows a generic system for registering assets and accessing multiple federated media repositories.

The claimed invention provides a central asset registry system, implemented as a graph database. The central asset registry system provides a database and set of services to access aggregated information of distributed media asset sources. The central asset registry system maintains a list of assets and their relationships. The central asset registry provides end users and programmatic access the ability to efficiently query and retrieve assets across multiple repositories in multiple locations. The system allows an arbitrary number of underlying repositories to be represented and scaled effectively.

The claimed invention also provides a pluggable architecture to provide extensibility and dynamic expansion as needed. The pluggable architecture supports parallel development by different teams as features can be implemented as separate components. Pluggable repositories may be custom-developed, commercial suites, centrally located, or may be geographically dispersed. Additionally, the pluggable architecture provides a defined interface to facilitate additional development.

The claimed invention includes a scalable, graph-centric data storage and analysis system (i.e., graph engine instantiating the enterprise logic implemented as service wrappers around a graph database) as the central asset registry. The graph engine instantiates, manages, and stores complex networked (related) structures through the use of a relationship or "graph" database. The graph database stores and represents actors and relationships as graph structures, instead of table entries in a relational database. The data structure of the graph engine uses graph objects to represent the data, including nodes and edges. Each of the graph objects can be defined by and coupled with ontological categories of a particular ontology. In one embodiment of the invention, the ontology includes a cable television ontology—a "concept framework" that models cable television programming interaction as a set of interrelationships between MVPDs (multichannel video programming distributors) and shows. As will be discussed, utilizing data structures that are composed of graph objects, coupled with a particular ontology, allows the graph objects to be stored, combined, and represented in a semantically meaningful way, which facilitates data consistency, advanced analytics, and visualization of complex networks.

At a top level of a multilevel storage hierarchy, a digital asset management (DAM) system is configured to provide management actions and decisions regarding the ingestion, annotation, classification, storage, retrieval, and distribution of digital assets. In one example embodiment of the claimed invention, the digital assets include media assets (media content) such as still images, video images, audio recordings, animations, and other types of audio, visual, and written content, and the DAM system can be termed a "media asset management system" (MAM). While recognizing differences between these types of systems, for simplicity and brevity, the term "repository" can be used to connote a system for managing a set of metadata about an inventory of digital assets.

Likewise, an "asset" is a general term for a media entity such as an episode of a television show. Assets are hierarchical and may be a container for other entities. For example, a show titled "Chopped" could be an asset. A specific episode of that show titled "Fried Chicken Time" would also be an asset. An "abstract asset" is a term used to represent a grouping of the variations of a single media entity. For example, an abstract episode would represent a linear broadcast episode for a given show and series. Many variations of the abstract episode may exist, differing in format and editing to meet business requirements.

"Variants" are concrete, actual implementations of the abstract episode that differ only in format. A low resolution and high resolution implementation of the same abstract episode would be considered variants of each other.

"Versions" are concrete, actual implementations of the abstract episode that differ materially in the content, not just the format. For example, an implementation of an abstract episode that was edited for time would be a version.

The graph engine manages a database that stores graph objects (media assets) that proxy media assets held in one or more media repositories. Each media repository holds detailed asset metadata and an inventory of asset instances. An instance is the actual media physical object. Examples of instances include image files of various formats, such as "jpeg," "tiff," or "bmp." Examples of video instances include digital files of various formats such as "mov," or "mp4." Instances may be digital or analog and may be physically stored on a variety of media such as tape or computer disk. Instances may exist in multiple physical locations, such as one instance in a repository in data center A with another instance in a repository in data center B. A given asset may have many associated instances.

A media registry can include many hundreds of millions or billions of graph objects. Repositories can be partitioned from a single storage medium or can be located alongside each other in one physical computer system or can be geographically separated in different computers, different buildings, different cities, and different countries. The graph objects in the registry may proxy assets in remote repositories (media DAMs) that allows for the federation of repositories. The remote repositories control access to their digital assets. With federated repositories, the size of the maintained data set can be effectively unlimited.

The underlying detailed metadata for the assets can be located in the individual media repositories. The graph objects in the central asset registry act as proxies with identifiers that act as keys into the individual media repositories. In this manner, relationships between assets can be recorded in the graph database without having to import or replicate all the repository metadata.

Repository and registry underlying technology may be replaced over time, allowing each module to be horizontally and vertically scaled as needed. The pluggable architecture prevents lockin to any given vendor solution or technology.

A registry can include a set of media assets (graph objects) that include an ontology, that is, a formal naming and definition of the types, properties, and relationships of the media assets. The ontology can have a general purpose facility for defining and refining categorical structures and other ontological elements. The ontology does not need to be dedicated to a particular ontological domain, such as cable television. These facilities are also used to define the overall system ontology, which categorizes the objects used in the implementation of the graph engine itself and can be used to build other ontological structures.

Repositories (DAMs) can contain different ontological structures, but in one embodiment of the invention, every repository contains a base ontology. In another embodiment of the invention, the repositories can include different media asset types. For example, one repository can include still image objects, another repository can include video objects, and another repository can include recipes. To simplify boot-strapping of the system, the base ontology can correspond to a small set of pre-defined unique identifiers. The overall system ontology can use these identifiers the same way in every DAM, to identify the built-in ontological categories and other ontology-related objects that are required by the system. As a minimum, each DAM repository just needs an asset identifier, which can be used by the central asset registry to link the registry with the given repository.

The system uses metadata to describe the media assets in the DAM repository. For example, the metadata can describe the asset contents, the location of the asset, the means of encoding/decoding, the history of the asset, ownership, access rights, and the like. In one example embodiment, the system uses the Dublin Core schema of vocabulary terms to describe the assets. In another example embodiment, the system uses the PBCore metadata standard as a set of specified fields in the database to catalogue and manage the assets.

Figure 5:
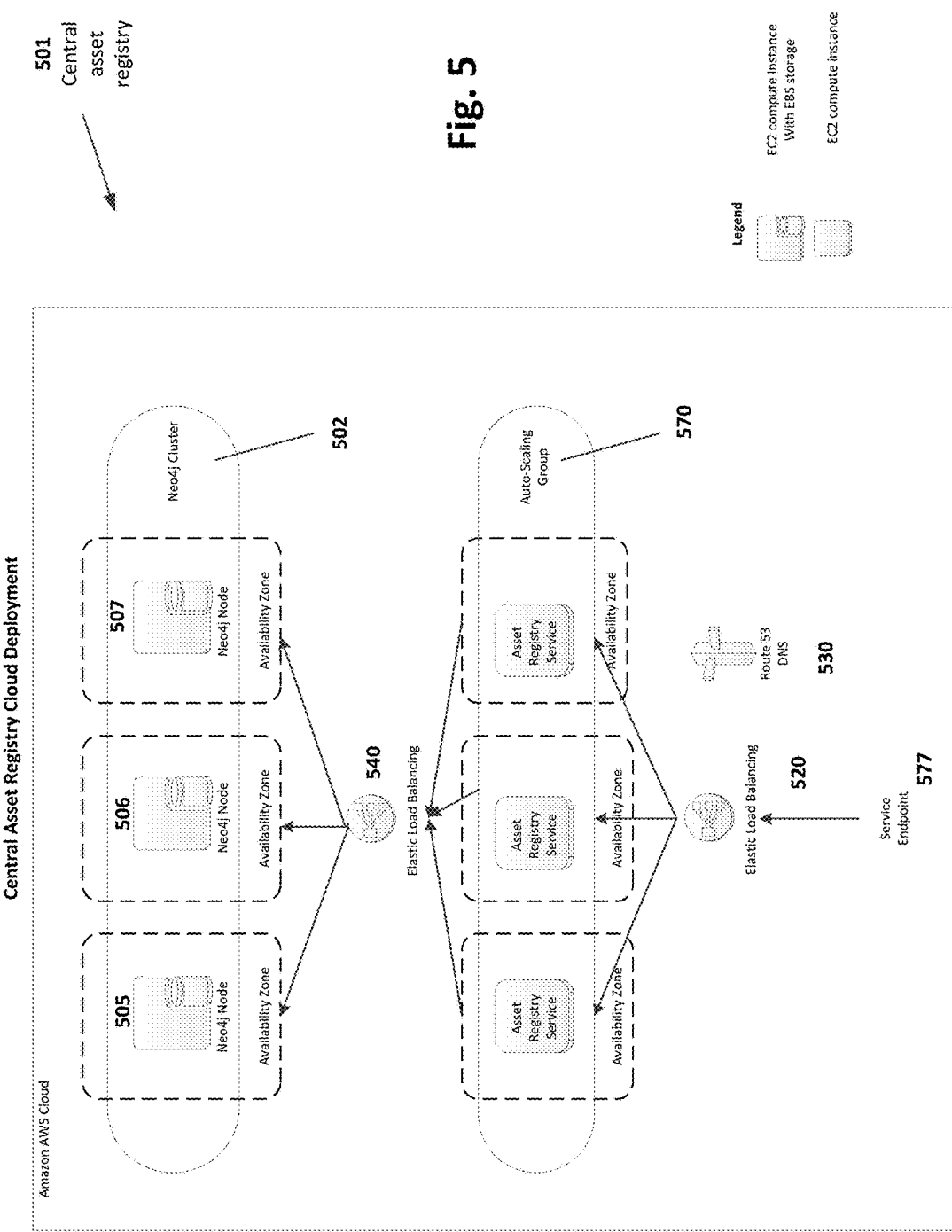
FIG. 5 shows a central asset registry system deployed in a cloud infrastructure in accordance with the claimed invention.

The central asset registry has been implemented in several different physical configurations. For example, FIG. 5 shows a central asset registry 501 in a cloud deployment to an Amazon Web Service (AWS) cloud environment. This cloud deployment diagram (FIG. 5) can be directly mapped to the generic distributed repository framework shown in FIG. 1. For example, the Asset Registry Service 570*a*, 570*b*, 570*c* (collectively shown as an Auto-Scaling Group 570) in FIG. 5 corresponds to the Registry Service Layer 170 in FIG. 1. Similarly, the Neo4j Cluster 502 in FIG. 5 is (are) the database(s) housing the relationship registry 151, the rights registry 153, and the other registry 155 shown in FIG. 1. The Neo4j master slave clustering architecture (cluster 502) is a set of database instances working together in a master/slave relationship. The cluster management is managed by the Neo4j nodes 505, 506, 507 via a TCP connection between the nodes. The nodes 505, 506, 507 handle self-nomination to master and settle consistency checks between the nodes. Lastly, the Service Endpoint 577 in FIG. 5 corresponds to the Service Entry Point 177 in FIG. 1.

The cloud deployment shown in FIG. 5 leverages Amazon Web Service (AWS) cloud built-in environment functions. The Auto-Scaling Group 570, Elastic Load Balancing 520, 540, and Route 53 DNS 530 are all available as components of the AWS cloud environment. For example, auto-scaling group 570 relates redundant copies of a service and/or application over one or more availability zones (essentially different data centers). In the cloud deployment of FIG. 5, the claimed invention can leverage the inherent capabilities and features of the AWS cloud environment. Likewise, in other deployment environments, the central asset registry of the claimed invention can capitalize on the capabilities and features of those deployment environments as well.

Figure 8:
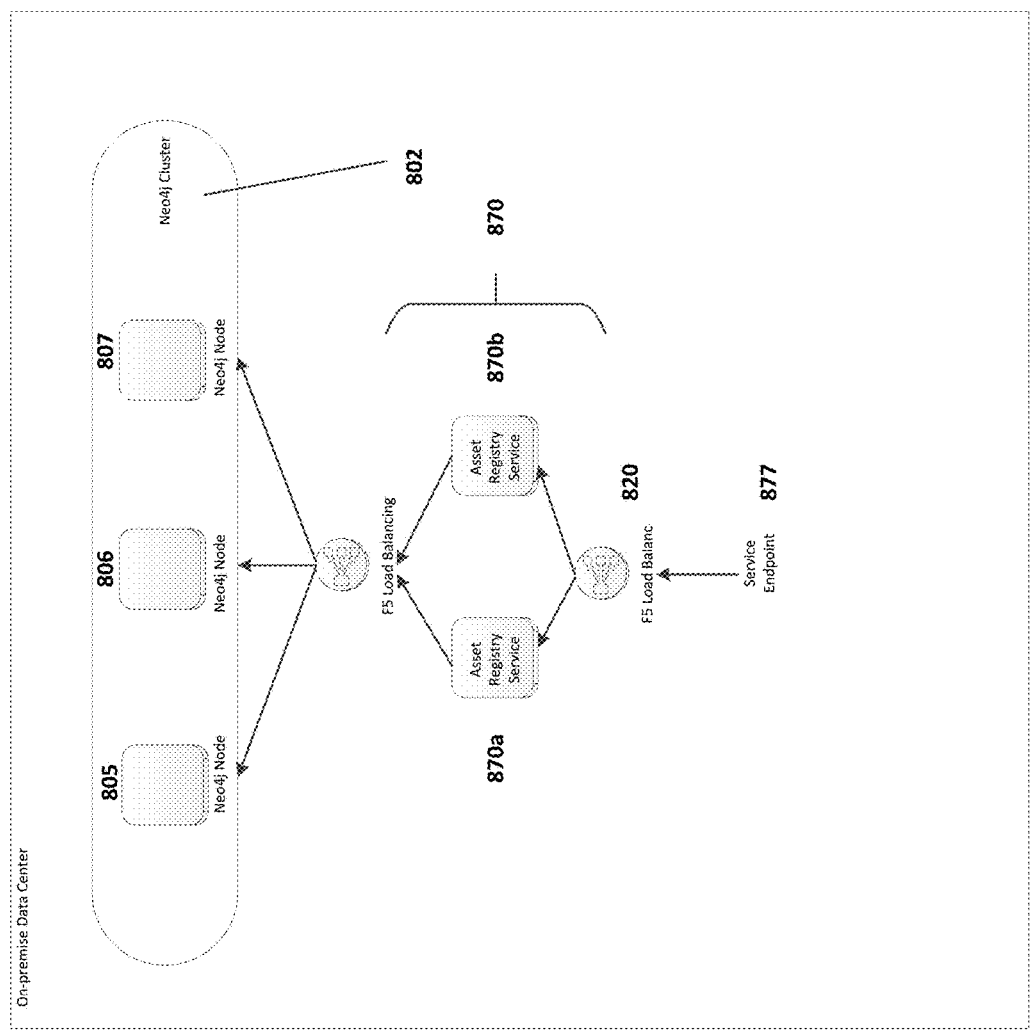
FIG. 8 shows a central asset registry system deployed in a data center in accordance with the claimed invention.

For example, FIG. 8 shows a deployment of a central asset registry 801 to a corporate data center environment. The corporate data center deployment can be on physical computer systems, virtual systems, or a combination of the two. This corporate data center deployment (FIG. 8) can be directly mapped to the generic distributed repository framework shown in FIG. 1. For example, the Asset Registry Service 870*a*, 870*b*, (collectively 870) in FIG. 8 corresponds to the Registry Service Layer 170 in FIG. 1. Similarly, the Neo4j Cluster 802 in FIG. 8 is (are) the database(s) housing the relationship registry 151, the rights registry 153, and the other registry 155 shown in FIG. 1. The Neo4j master slave clustering architecture (cluster 802) is a set of database instances working together in a master/slave relationship. The cluster management is managed by the Neo4j nodes 805, 806, 807 via a TCP connection between the nodes. The nodes 805, 806, 807 handle self-nomination to master and settle consistency checks between the nodes. Lastly, the Service Endpoint 877 corresponds to the Service Entry Point 177 in FIG. 1.

Figure 7:
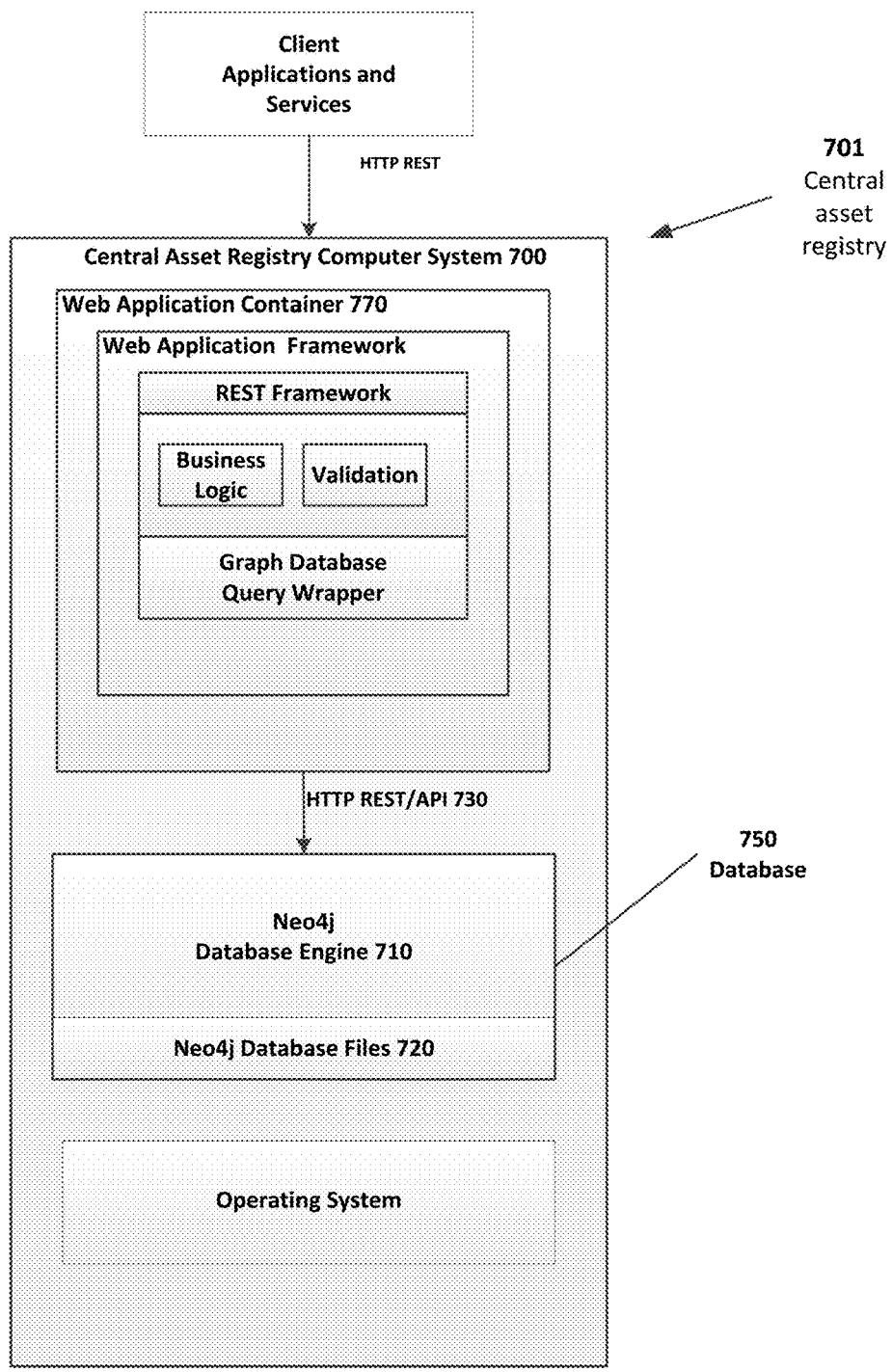
FIG. 7 shows a component drawing of a central asset registry system deployed in a single computing device.

These example deployments are representational only, and the central asset registry can be deployed to a number of physical configurations, including a combination of those described above. For example, FIG. 7 shows a central asset registry 701 deployed to a single physical computing device (system 700). The web application container 770 of FIG. 7 holds an implementation of the registry service layer 170, DAM Service1 141, DAM Service2 142, DAM Service3 143, DAM Service n 144, composition service layer 160, and event generator 180 depicted in FIG. 1. Additionally, the computer system 700 holds an instance of registry database 750, including database engine 710 and database files 720. The registry database 750 includes an implementation of the relationship registry 151, rights registry 153, and other registry 155 shown in FIG. 1. In FIG. 7, the registry database 750 shown is the Neo4j graph database deployed as a single node. Other databases can be used in a similar fashion. The registry service layer contained in the web container 770 can query the database either via a REST service call or via a native API call 730.

Central Asset Registry System for Media Assets

As shown in FIG. 1, a central asset registry system 100 of media assets in accordance with the claimed invention separates the registry 101 from the various DAMs (repositories) 131, 132, 133, 134. The registries 151, 153, 155 together provide a central logical place to hold a list of all the assets spread over the various repositories 131, 132, 133, 134. The resultant framework integrates multiple DAMs (repositories) and registries through a service layer allowing abstraction of the actual underlying repositories and registries. The architecture allows new DAMs or registries to be plugged into the framework seamlessly. Existing DAMS and registries can be refactored or switched to entirely new technologies without impact to the overall system.

Figure 9:
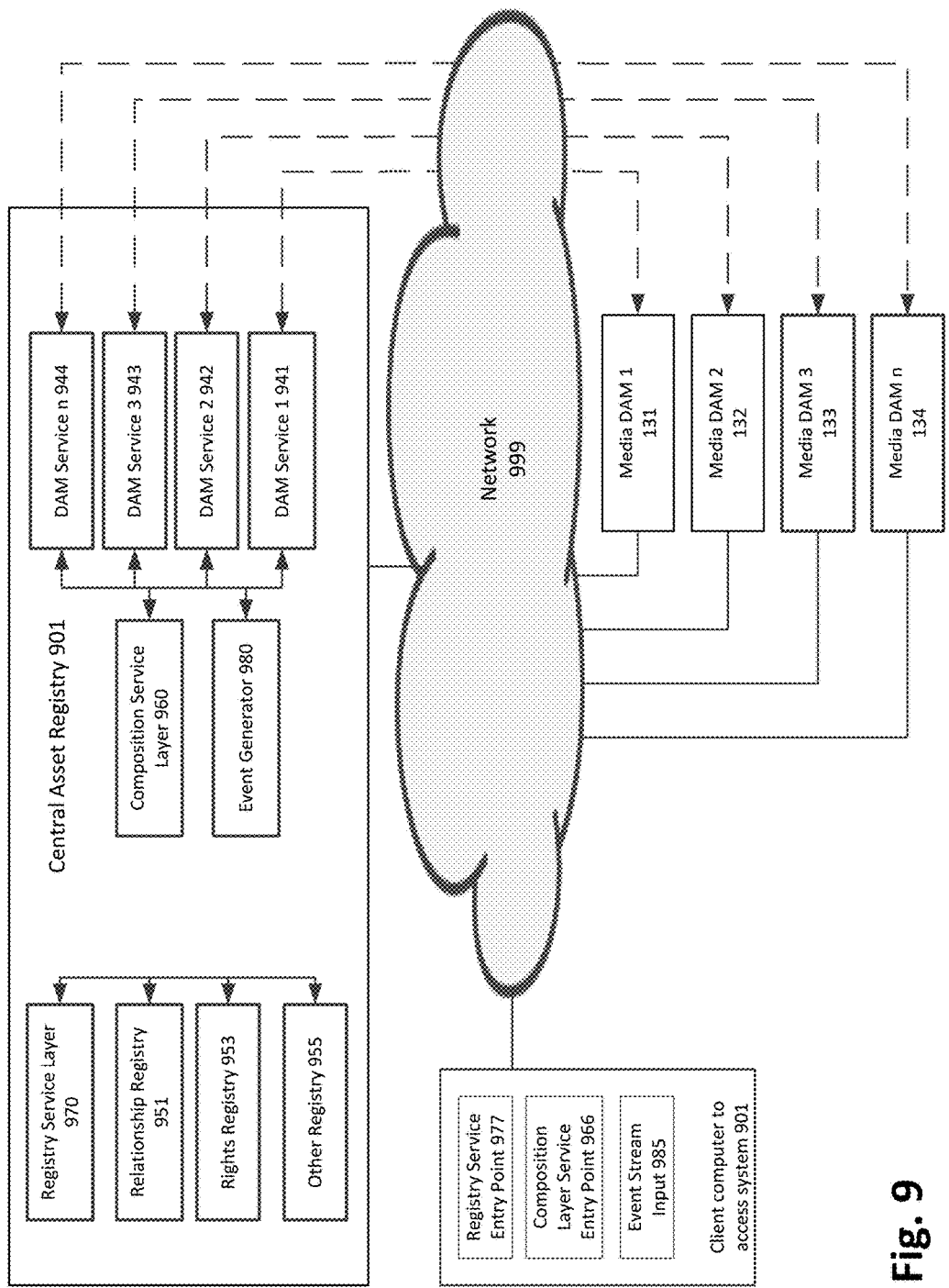
FIG. 9 shows a component drawing of a central asset registry system deployed as a computing device in contact with a network of computing devices.

FIG. 9 provides a simplified component drawing of a system 900 with a central asset registry 901 of media assets separated from the various DAMs (repositories) 131, 132, 133, 134, such as a deployment that can be implemented on a single computer system. The central asset registry 901 of media assets shown in the system 900 of FIG. 9 incorporates a registry service layer 970 (akin to registry service layer 170 in FIG. 1) as well as a relationship registry 951, rights registry 953, and other registry 955. The central asset registry 901 of media assets of FIG. 9 also includes a composition service layer 960 (akin to composition service layer 160 in FIG. 1) as well as DAM services 941, 942, 943, 944 to service the media DAMs 131, 132, 133, 134. The resultant central asset registry 901 of media assets provides a centralized registry as well as services to access the federated media DAMs 131, 132, 133, 134. Other configurations of the components are also possible, such as cloud deployments, data center deployments, and the like, as described above. The components described with regard to FIG. 9 can also be hosted on separate computer systems to allow for independent clustering and scaling.

Returning to FIG. 1, the pluggable modules 102 on the right side of FIG. 1 represent the actual implementations of each registry and DAM (repository). For example, Media DAM1 131 can be a repository for image assets implemented by a third party vendor in their data center. Media DAM2 132 can be a repository of video assets implemented as a custom system in a cloud data center, such as in a SaaS DAM. Similarly, Media DAM3 133 can be a repository of recipe assets stored in an on-premise system data center. Any number of DAMs can exist and can be distributed geographically and/or implemented to focus on specific asset types (e.g., still image assets, video assets, recipe assets, and the like). The framework allows separate scaling of individual DAMs to match business needs as each repository grows. While FIG. 1 shows four DAMs 131, 132, 133, 134, the number and type of DAMs can be scaled and customized based on content stored in each DAM, location of each DAM, vendor and business relationships, and other factors.

As further shown in FIG. 1, the registries 151, 153, 155 together provide a central logical place to hold a list of all the assets spread over the various DAMs (repositories) 131, 132, 133, 134. The resultant framework integrates multiple DAMs (repositories) 131, 132, 133, 134 and registries 151, 153, 155 through a service layer 103 allowing abstraction of the actual underlying DAMs (repositories) and registries. The architecture allows new registries to be plugged into the framework seamlessly. Existing DAMS and registries can be refactored or switched to entirely new technologies without impact to the overall system.

Multiple registries can exist that focus on different asset relationships. One Relationship Registry 151 may associate assets in a hierarchical inheritance structure such as shows/series/episodes. Another Rights Registry 153 may relate the inbound and outbound intellectual property rights to each asset. Yet another registry 155 may relate assets to various geographic locations. Other registries can also be used to relate assets to business partners. The registries 151, 153, 155 can be implemented separately or combined. Also, they may be deployed in a number of combinations such as cloud or on premise. The number and types of registries is expandable and can be based on many factors in addition to the examples listed.

The left side of FIG. 1 depicts the framework 103 built over the actual DAMs (repositories) and registries. The framework 103 includes several layers of services. At the lowest layer, a DAM service exists for each actual Media DAM (repository). For example, DAM Service1 141 is a service implementation over Media DAM1 131, DAM Service2 142 is a service implementation over Media DAM2 132, DAM Service3 143 is a service implementation over Media DAM3 133, and DAM Service n 144 is a service implementation over Media DAM n 134, and so on for all the actual repositories. This service abstraction layer allows any given repository to be replaced by a new vendor implementation, custom system, or even refactoring of an existing repository without disrupting the other DAMs (repositories). The DAM services 141, 142, 143, 144 can be optimized for the particular type of media asset stored in each of the DAMs to provide optimal interface service and support.

A composition service layer 160 exists over each DAM service 141, 142, 143, 144, abstracting the interface to each DAM (repository) 131, 132, 133, 134. In this way, new DAMs can be introduced without changing the service entry point 166 to the composition service layer 160. The composition service layer 160 can include asset entity services, instance retrieval services, and search and view capabilities. Consumers of the composition service layer 160 do not have to change when new DAMs are introduced or lower interfaces (such as DAM services 141, 142, 143, 144) change. The composition service layer 160 provides a single entry point (composition layer service entry point 166) to access assets from any DAM (repository).

The registry service layer 170 provides a single entry point 177 to access information from any of the underlying registries 151, 153, 155. The use of the registry service layer 170 allows introduction of new registries or changes to implementations of existing registries without impacting consumers of the service via the registry service entry point 177. All assets from the various repositories have at least an entry in the relationship registry 151. The list of assets in the relationship registry 151 therefore ties all the repositories 131, 132, 133, 134 together.

The framework 103 provides an event generator 180 to publish events whenever asset metadata, relationships, or physical instances change in the system 100. The event generator 180 provides a fast, reliable, and scalable message queuing service. Subscribers can access queues and topics to exchange data using point-to-point or publish and subscribe patterns. The event stream 185 is available for any other system to be notified of changes in any aspect of the data contained in one of the pluggable modules (registries 151, 153, 155 or DAMs 131, 132, 133, 134).

Central Asset Registry Method for Media Assets

Figure 2B:
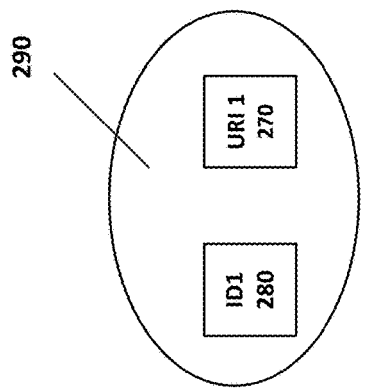
FIG. 2B shows a sample representation of an example media asset registry entry used in accordance with the claimed invention.

FIG. 1 shows a central asset registry system 100 for registering and accessing assets over multiple federated media repositories (DAMs 131, 132, 133, 134). As further shown in FIG. 2B, upon ingest, each media asset (registry entry) 290 is added to the central asset registry 101 and assigned a unique identifier 280 via the central asset registry service 170. Detailed metadata about the asset and the physical asset itself is placed in a repository (DAMs 131, 132, 133, 134). That unique identifier 280 is used to "relate" the asset 290 to a position in an asset hierarchy 200 (shown in FIG. 2A). The repository (DAMs 131, 132, 133, 134) maintains the detailed metadata about the asset 290 and the instance inventory. Multiple repositories (DAMs 131, 132, 133, 134) can exist distributed over multiple geographic areas or separated by asset type. A central asset registry 101 is used to hold the identifiers 280 of assets over all repositories (DAMs 131, 132, 133, 134) and holds the relationships between the assets 290. The central asset registry 101 can have a sparse set of metadata including reference to the underlying repository (DAM 131, for example) with asset and instance location. In the central asset registry 101, location of asset repository 270 and instance entities are represented by a URI and other descriptive metadata.

Figure 2A:
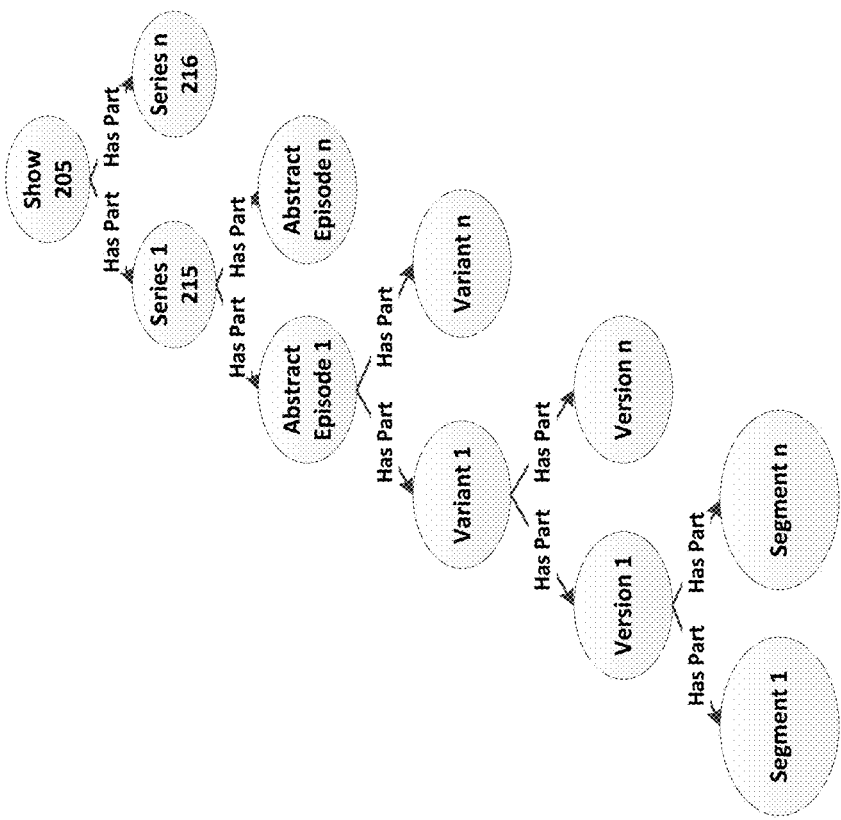
FIG. 2A shows a sample representation of a media asset hierarchy over one of many possible relationship dimensions.

The central asset registry 101 can be implemented as a graph database to efficiently track asset relationship and identifier information. FIG. 2A shows an example media asset hierarchy 200 as a directed graph. In general, graph edges or relationships can be "directed" or "undirected." A directed relationship points explicitly from one node to another. For example, a directed edge may point from a "Show" 205 to a "Series 1" 215 with edge type "Has Part" 210. An undirected edge can be used to point from one peer to another, without implying a hierarchy. For example, an undirected edge may point from one variant of an episode to another or from one actor to another.

In more complex ontologies, category nodes must be organized into a categorical structure, such as a hierarchy, where categories "lower" in the hierarchy represent specializations (or descendants) of categories "higher" in the hierarchy. For instance, the node that represents the category of "Show" 205 might have several more specific descendant categories that represent specific kinds of shows, including different "Series" of the "Show" 205, such as "Series1" 215 and "Series n" 216. To model this using the graph object structure discussed above, the graph engine can include as part of the built-in ontology an edge category called "Has Part" 210. In practice, an edge that refers to the "Has Part" 210 as its ontological category can link, for example, the "Show" category node 205 with a descendant category node, such as "Series1" 215, to indicate that the "Series1" category node 215 is a sub-type of the "Show" category node 205. The semantic meaning of edges 210 that are marked with the "Has Part" category can be part of the built-in ontology of the graph engine, and can be how the ontological machinery is boot-strapped.

Figure 3:
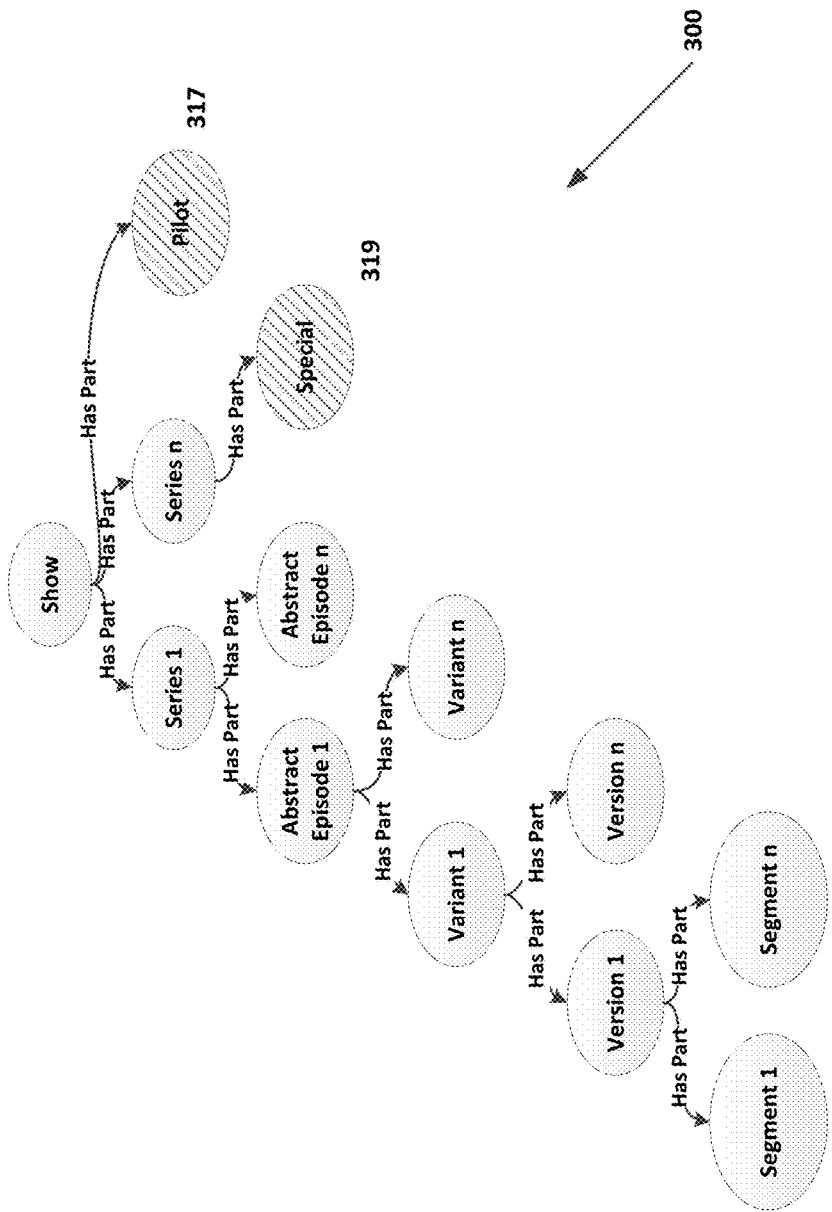
FIG. 3 illustrates a dynamic addition of a new asset type in the media asset hierarchy ontology structure of FIG. 2A.

Another example can be the addition of "Pilots" 317 and "Specials" 319 as new asset types as shown in the asset hierarchy 300 in FIG. 3. The use of a graph database allows new asset types to be dynamically added without refactoring the rest of the system or any clients that access the graph engine. Client modules or downstream systems that don't need to know about "Specials" can continue to use the system without change.

Figure 4:
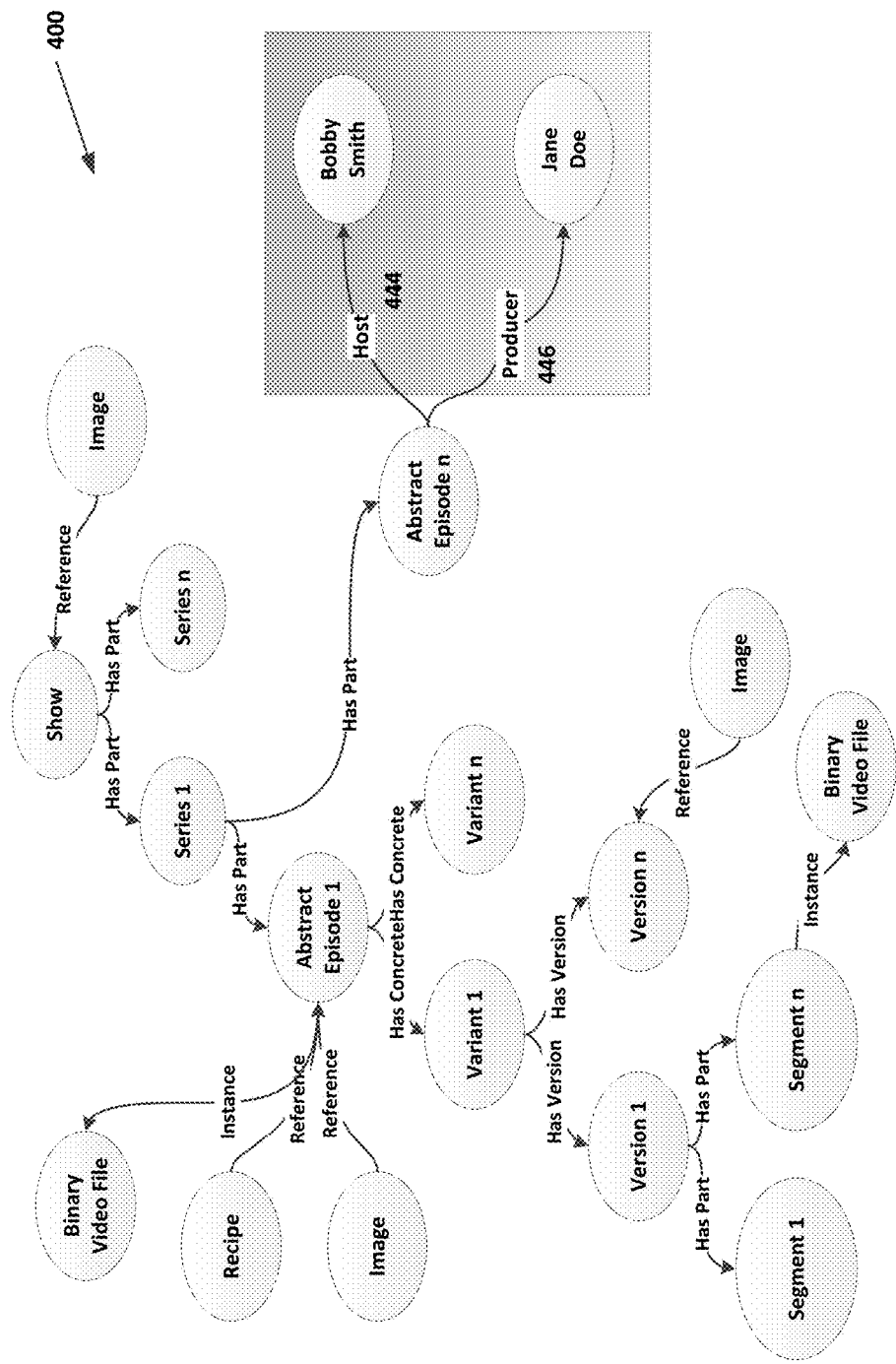
FIG. 4 shows a dynamic addition of a new relationship type in the media asset hierarchy ontology structure of FIG. 2A.

Using media assets as a graph allows dynamic addition of new relationship types, such as the ability to relate people to media assets and include their role such as "Host," 444 "Producer," 446 and so forth as shown in the asset hierarchy 400 in FIG. 4. Relationship types may be added dynamically without refactoring the rest of the system or any clients that access the graph engine.

Integration to the system 100 shown in FIG. 1 is via the Registry Service Entry Point 177, The Composition Layer Service Entry Point 166, and the Event Stream 185. The implementation of the module integrating to the service entry points 177, 166, 185 might be a graphical user interface, an API call from another system, a module polling a watch folder, or other mechanism. Calls using an API interface, for example, typically involve REST or SOAP protocols via HTTP over TCP/IP networks. Interface via a graphical user interface might involve a web browser-based application, a thick client installed on a workstation, or other user interface technology.

A media database of the claimed invention can include people, who are actors, directors, producers, and the like. The media database also includes movies, videos, television shows, still pictures, and other "productions" that are viewed by an audience. Many actors appear in many television shows, and many video productions. The actors' roles can be defined and tracked as well. Additionally, television shows can include a number of different episodes, and actors may star in a single episode or in many episodes over many seasons.

Figure 6:
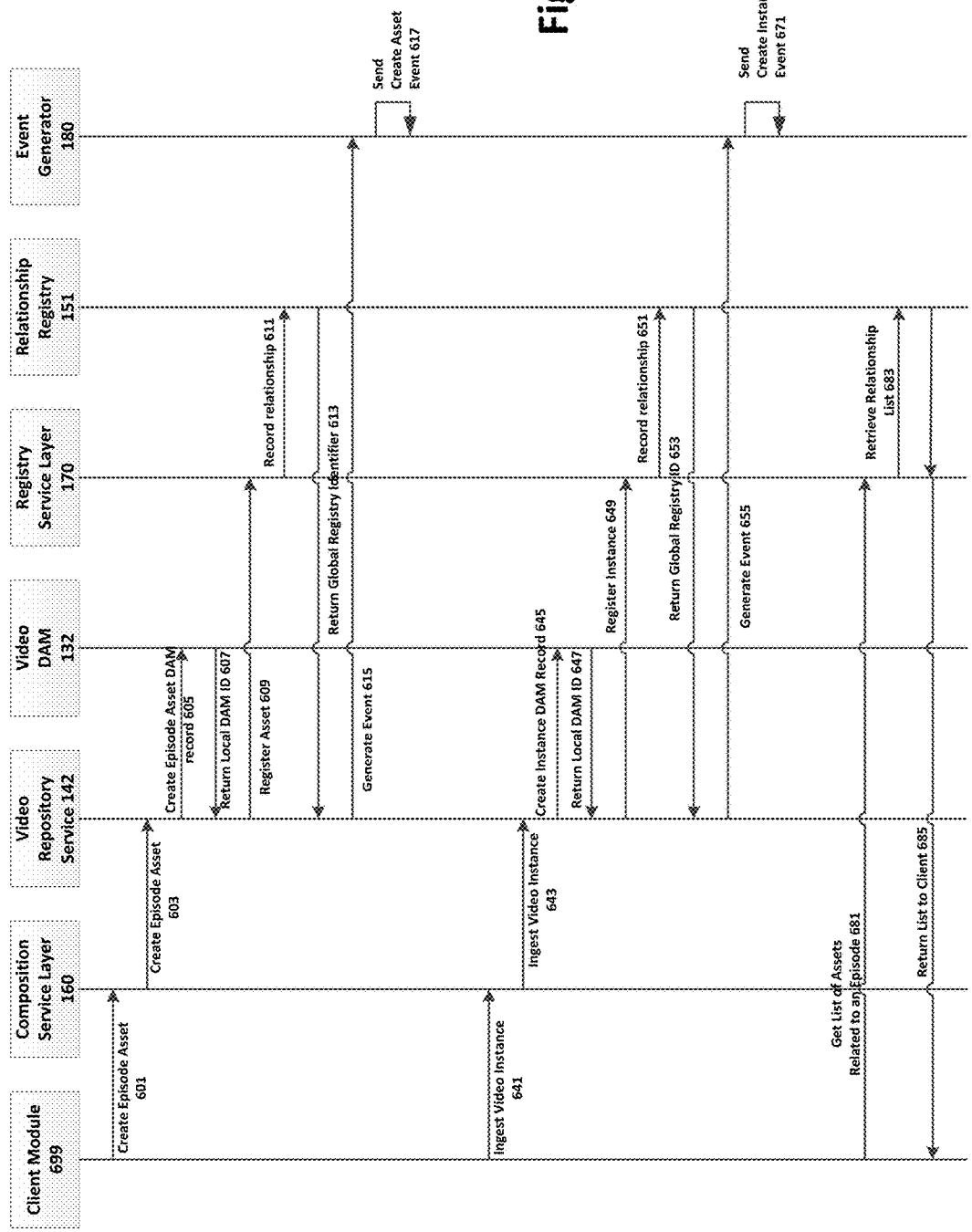
FIG. 6 is a sequence diagram showing one example of how assets can be added to the system and registered and how they may be subsequently accessed via an API interface.

FIG. 6 is a sequence diagram showing one example of how assets may be added to the system 100 and how they may be subsequently accessed via an API interface. For asset creation, the client module 699 calls the Composition Service Layer 160 to create an episode asset 601, which directs the call to the Video Repository Service 142 to create the episode asset 603. The Video Repository Service 142 provides a service wrapper over the actual Video Media DAM 132 to create an episode asset DAM record 605. The Video Media DAM 132 is responsible for holding the detailed metadata about the new asset and returns a local DAM identifier 607 to the Video Repository Service 142. The Video Repository Service 142 now calls the Registry Service Layer 170 to record 609 the new asset in the central asset registry 101. The Registry Service Layer 170 calls the Relationship Registry 151 to record 611 the new asset in the graph database, returning 613 the global registry identifier back up the call chain to the Video Repository Service 142. Lastly, the Video Repository Service 142 calls 615 the Event Generator 180 to send out an Asset Creation event 617. The Event Generator 180 is responsible to distribute the event to any listeners of the Event Stream.

Once an asset is created, instances of the asset may be added to the system. Instances are the actual physical objects corresponding to the asset. For an episode, for example, the instance may be an MP3 video file. In the example of FIG. 6, the client module 699 calls the Composition Service Layer 160, which directs the call the Video Repository Service in much the same sequence as when creating an asset. The main difference is in this case the Event Generator would send out an Instance Creation event to indicate a physical copy of the asset has been added to the system.

Once the asset is created in the repository, the instance (or physical asset files) can be ingested. During this process, the client module 699 calls the Composition Service Layer 160 to ingest a video instance 641, which directs the call to the Video Repository Service 142 to create the video instance 643. The Video Repository Service 142 provides a service wrapper over the actual Video Media DAM 132 to create an instance DAM record 645. The Video Media DAM 132 is responsible for holding the detailed metadata about the new instance and returns a local DAM identifier 647 to the Video Repository Service 142. The Video Repository Service 142 now calls the Registry Service Layer 170 to record 649 the new instance in the central asset registry [101]. The Registry Service Layer 170 calls the Relationship Registry 151 to record 651 the new instance in the graph database, returning 653 the global registry identifier back up the call chain to the Video Repository Service 142. Lastly, the Video Repository Service 142 calls 655 the Event Generator 180 to send out an Instance Creation event 657. The Event Generator 180 is responsible to distribute the event to any listeners of the Event Stream.

Similar mechanisms exist to modify and delete assets and asset instances. Again, multiple protocols and transports may be used.

Once the assets and instances have been added, the system can be queried to retrieve metadata, relationships, or the actual instance files. As an example, the sequence at the bottom of FIG. 6 depicts retrieving a list of assets related to a given episode. In this example, when a user commences a search for an asset, the client module 699 calls the Registry Service Layer 170 for a list of related assets 681. The Registry Service Layer 170 in turn calls the Relationship Registry 151, retrieves the information 683, and returns the list of related assets back to the client 685. The list of related assets can include assets stored in many of the distributed repositories. The client query to the central asset registry 101 looks up descriptors and identifiers of the content, and returns an identification of the related assets, their respective locations, and their relationship to one another based upon matching metadata descriptors. The system returns pointers to the related assets to provide a list to the user. The identification can be provided as thumbnail images of the asset, size, location, rights, and the like. The user can then select and receive a digital asset or set of assets from the list. In this fashion, the graph data is accessed by accessing a node by index and then traversing through the set of relationships. To further improve performance of the system, search results can be cached to avoid repeated accessing operations of the same content.

Previous systems required ingestion of the assets into the system and then assigning rights to the assets. The system of the claimed invention assigns rights to the individual assets in the separate repositories. In this fashion, users are not locked into a single vendor's product or a single architecture. Each repository can be a different commercial product made by different companies, for example. The central asset registry pulls the assets together and assigns rights.

The creation of a central asset registry separate from the individual repositories is key in providing a pluggable architecture with the ability to plug in different repositories by geographic location, asset type, or other considerations as business needs change. The use of a graph database for the central asset registry offers optimized speed and flexibility to traverse relationships and add new relationship types.

The claimed invention is:

1. A system for ingesting and registering digital assets in a distributed repository framework, the system comprising:
   a plurality of federated repositories, including memory and processors, the plurality of federated repositories connected to a communications network, wherein at least one of the plurality of federated repositories ingests and maintains digital assets with metadata tags by
      receiving an asset record from a repository service based on an asset creation request from a client;
      returning a local repository identifier to the repository service; and
      calling a registry service to register the asset record and the local repository identifier;
   a central registry of digital assets, connected to the communications network and including a rights registry and a relationship registry, and
      receiving the call from the registry service to register the asset record and the local repository identifier;
      registering the asset record and the local repository identifier in the relationship registry; and
      returning a global registry identifier to the repository service, wherein the global registry identifier includes relationship information concerning the received asset record from the repository service;
   wherein the asset record registered in the relationship registry of the central registry of digital assets includes an asset relationship hierarchy designation and an asset identifier, and the local repository identifier includes repository location information concerning the digital assets from the at least one of the plurality of federated repositories;
   wherein the central registry of digital assets includes at least one pluggable relationship registry and one pluggable rights registry, wherein the at least one pluggable relationship registry and the one pluggable rights registry are modular and changeable without refactoring the plurality of federated repositories; and
   wherein the central registry of digital assets registering the asset relationship hierarchy designation and the location information of the digital asset provide the client a comprehensive view of the digital assets in the plurality of federated repositories that make up the system.

2. A system for managing digital assets in a distributed repository framework of claim 1, wherein the central registry of digital assets is a graph database.

3. A system for managing digital assets in a distributed repository framework of claim 2, wherein the graph database includes a registry node as a proxy to a corresponding digital asset stored in at least one of the federated repositories.

4. A system for managing digital assets in a distributed repository framework of claim 2, wherein the graph database includes graph objects corresponding to the relationship data of the digital assets and a categorization of the graph objects representing a hierarchy of the digital assets.

5. A system for managing digital assets in a distributed repository framework of claim 2, wherein the graph database includes a property graph data model with nodes, relationships, properties, and labels in a hierarchy of the digital assets.

6. A system for managing digital assets in a distributed repository framework of claim 1, wherein the central registry of digital assets includes a uniform record to each of the digital assets.

7. A system for managing digital assets in a distributed repository framework of claim 1, wherein the plurality of federated repositories includes at least one pluggable digital asset management (DAM) repository.

8. A system for managing digital assets in a distributed repository framework of claim 7, wherein the at least one pluggable digital asset management repository is configured to store a single digital asset type.

9. A system for managing digital assets in a distributed repository framework of claim 8, wherein the single digital asset type is one of still images, videos, text, or recipes.

10. A system for managing digital assets in a distributed repository framework of claim 1, wherein the repository service calls an event generator to send out an asset creation event to the client.

11. A system for managing digital assets in a distributed repository framework of claim 1, further comprising:
a proxy service
masking underlying platform information;
abstracting the plurality of federated repositories into the asset record, wherein the asset record is a uniform record independent of media type and independent of repository type in which the digital asset is stored; and
providing a single client interface to the plurality of federated repositories.

12. A system for managing digital assets in a distributed repository framework of claim 1, wherein the central registry of digital assets receives property rights related to the digital assets from the plurality of federated repositories based on the metadata tags of the digital assets when a digital asset is saved to one of the plurality of federated repositories.

13. A system for managing digital assets in a distributed repository framework of claim 1, wherein the central registry of digital assets includes an asset relationship hierarchy for rapid navigation across digital assets in the plurality of federated repositories.

14. A system for managing digital assets in a distributed repository framework of claim 1, wherein the central registry of digital assets includes an asset relationship hierarchy incorporating multiple media types.

15. A system for managing digital assets in a distributed repository framework of claim 1, wherein the plurality of federated repositories are located in disparate geographic locations.

16. A system for managing digital assets in a distributed repository framework of claim 1, wherein at least one of the digital assets saved to one of the plurality of federated repositories includes a new relationship type of relationship information based on the metadata tag of the at least one digital asset.

17. A system for managing digital assets in a distributed repository framework of claim 1, wherein at least one of the digital assets saved to one of the plurality of federated repositories is a new media type and includes relationship information and location information concerning the new media type digital asset based on the metadata tag of the at least one digital asset.

18. A system for managing digital assets in a distributed repository framework of claim 17, wherein the central registry of digital assets receives the new media type relationship information and location information when the new media type digital asset is saved to one of the plurality of federated repositories and updates the comprehensive view of the digital assets in the plurality of federated repositories that make up the system.

19. A system for managing digital assets in a distributed repository framework of claim 1, further comprising:
a registry service that provides a programmatic interface and queries the central registry of digital assets to access digital asset metadata across the plurality of federated repositories.

20. A system for managing digital assets in a distributed repository framework of claim 19, wherein
the registry service receives an application program interface (API) call to query the central registry of digital assets.

* * * * *